US006263979B1

(12) United States Patent
Dyke et al.

(10) Patent No.: US 6,263,979 B1
(45) Date of Patent: Jul. 24, 2001

(54) INTERCHANGEABLE IMPLEMENT SYSTEM FOR POWER TOOLS

(75) Inventors: Colin Dyke, Ontario (CA); Calvin Edleblute, Stewartstown, PA (US); William Lessig, Monkton, MD (US); Robert Meloni, Baltimore, MD (US); John Vantran, Parkton, MD (US); Robert P. Wagster, Baltimore, MD (US)

(73) Assignee: The Black & Decker Corporation, Towson, MD (US)

( * ) Notice: Subject to any disclaimer, the term of this patent is extended or adjusted under 35 U.S.C. 154(b) by 0 days.

(21) Appl. No.: 09/354,722

(22) Filed: Jul. 16, 1999

Related U.S. Application Data

(60) Provisional application No. 60/094,082, filed on Jul. 24, 1998.

(51) Int. Cl.[7] .......................... B27B 19/02; B23D 45/02

(52) U.S. Cl. .......................... 173/170; 173/29; 30/122; 30/392

(58) Field of Search .......................... 173/170, 29, 217, 173/216, 131; 30/122, 500, 392; 408/20; 279/19.1; 464/177, 901

(56) References Cited

U.S. PATENT DOCUMENTS

| | | | | |
|---|---|---|---|---|
| Re. 30,680 | * | 7/1981 | Kress et al. | 464/177 |
| 2,621,689 | | 12/1952 | Fordon | 30/519 |
| 3,009,493 | * | 11/1961 | Dodegge | 408/20 |
| 3,056,439 | * | 10/1962 | Hall et al. | 408/20 |
| 3,140,746 | * | 7/1964 | Force | 173/170 |
| 3,469,313 | * | 9/1969 | Martin | 30/122 |
| 3,924,775 | | 12/1975 | Andreaggi et al. . | |
| 4,106,181 | | 8/1978 | Mattchen | 30/339 |
| 4,186,905 | | 2/1980 | Brudy . | |
| 4,294,013 | * | 10/1981 | Krieg | 30/392 |
| 4,449,062 | | 5/1984 | Wilson . | |
| 4,614,452 | | 9/1986 | Wang et al. . | |
| 4,648,609 | * | 3/1987 | Deike | 173/131 |
| 4,738,252 | | 4/1988 | Friddle et al. . | |
| 4,872,518 | * | 10/1989 | Crippin | 30/122 |
| 4,991,818 | | 2/1991 | Darbo et al. . | |
| 5,033,552 | | 7/1991 | Hu et al. . | |
| 5,190,390 | | 3/1993 | Ming-Tai . | |
| 5,322,302 | | 6/1994 | Quirijnen | 30/392 |
| 5,469,945 | | 11/1995 | Jserng . | |
| 5,581,891 | | 12/1996 | Wheeler et al. | 30/216 |
| 5,647,133 | | 7/1997 | Dassoulas | 30/392 |
| 5,687,483 | | 11/1997 | Neubert et al. | 30/312 |
| 6,101,726 | * | 8/2000 | Laverick | 30/392 |

OTHER PUBLICATIONS

Black & Decker Catalog, pp. 20–22 (Date Unknown).

* cited by examiner

*Primary Examiner*—Scott Smith
(74) *Attorney, Agent, or Firm*—Foley & Lardner

(57) ABSTRACT

A power tool system has detachable and interchangeable implements and driving sources. The interchangeable implements and driving sources use a housing having common mating interface to selectively assemble a power tool having the desired characteristics. A latch is used to hold a selected implement and driving source in functional engagement. An adjustable bale handle provides a comfortable and safe handhold for various configurations of the interchangeable implements.

30 Claims, 15 Drawing Sheets

INTERCHANGEABLE IMPLEMENT SYSTEM FOR POWER TOOLS

CROSS-REFERENCE TO RELATED APPLICATIONS

The benefit of priority under 35 U.S.C. § 119(e) is claimed based on U.S. Provisional Application Ser. No. 60/094,082, filed Jul. 24, 1998.

BACKGROUND OF THE INVENTION

1. Field of the Invention

The present invention is directed to power tools. In particular, the present invention is directed to a power tool having a system of detachable and interchangeable implements. The term "power tool" includes hand-held power tools such as hedge trimmers and chain saws, as well as mechanisms which are not hand-held but whose operation is controlled by the hands of a user, e.g., lawn mowers and grinders.

2. Description of Related Art

In order to perform a desired task using a power tool, it is important to select a power tool that has the proper configuration and capacity for accomplishing the task efficiently and safely. The size and shape of the working tool, the speed and power of the driving mechanism, as well as the comfort and safety of the user must always be considered.

Conventionally, a user selects the appropriate tool from a collection of similar devices each having different characteristics. For example, in order to select an appropriate hand-held, powered hedge trimmer, the user must make a number of choices: whether to use a single or a double edge cutting blade, the length of the cutting blade, the shape of the cutting teeth, whether driving power should come from an electric motor or an internal combustion engine, the amount of power and speed required for driving the cutting blade, etc. Given all the permutations of these characteristics, a large collection of variously configured hedge trimmers would be required. Generally, the cost of purchasing, maintaining and storing such a large collection of hedge trimmers is prohibitive.

It is much more common for a user to own a single hedge trimmer that is used in every situation, regardless of how well suited the hedge trimmer is to that particular situation. Under these circumstances, the efficiency and/or adequacy of the tool is often insufficient.

It is also conventional for a power tool to be of fixed configuration. Specifically, it is common for each tool to have a single relative arrangement of the handle, power source and working tool. One disadvantage of such a fixed arrangement is that the user is not able to adjust the power tool for safe and comfortable operation.

SUMMARY OF THE INVENTION

It is an object of the present invention to overcome these disadvantages of conventional power tools.

It is another object of the present invention to provide a power tool that may be readily selectively configured by the user for optimum efficiency, as well as ease and safety of operation.

It is yet another object of the present invention to provide an arrangement for mating a driving source with a detachable working implement selected from a range of interchangeable tools.

It is a further object of the present invention to provide a mating arrangement for connecting a driving source with a detachable working implement that does not require additional tools to make the connection.

It is yet a further object of the present invention to provide an arrangement for interchangeably supporting a working implement with respect to a driving source, and for transferring power from the driving source to the working implement.

The objects of the present invention are achieved by means of an attachment system for connecting a driven implement to a driving source including a power take-off accessible with respect to a main body. The attachment system comprises a housing adapted for supporting the driven implement and for matingly engaging the main body; a drive transfer adapted for matingly connecting the power take-off to the driven implement; and an implement mount adapted for supporting the driven implement for movement with respect to the housing.

The objects of the present invention are also achieved by means of a hand held power tool having at least one interchangeable implement. The power tool comprises a generally hollow main body having an exterior surface; a bale handle connected to the main body and adapted for gripping by the hand, the bale handle being pivotally mounted with respect to the exterior surface; a driving source being supported inside the main body and adapted for outputting mechanical energy; a power take-off transferring the mechanical energy outside the main body; a housing matingly engaging the main body in a first position, the housing adapted for supporting the implement; and a drive transfer operatively connecting the power take-off to the implement. The housing is detachably separable from the main body.

The objects of the present invention are further achieved by means of a power tool system for trimming hedges. The power tool system comprises a main body at least partially enclosing a driving source; a first housing adapted for mating engagement with respect to the main body, the first housing including a first set of relatively reciprocating blades adapted for being operatively driven by the driving source; and a second housing adapted for mating engagement with respect to the main body, the second housing including a second set of relatively reciprocating blades adapted for being operatively driven by the driving source. The first and second housings are interchangeably connectable with respect to the main body.

The objects of the present invention are yet further achieved by means of a latch arrangement for securing a housing with respect to a main body. The latch arrangement comprises at least one arm adapted for pivotal movement with respect to the main body about a pivot axis; a grip adapted for grasping to pivot the at least one arm, the grip being fixed to the at least one arm; and a cam surface on each of the at least one arm, the cam surface being adapted for biasing the housing toward the main body. The at least one arm is elastically deformed by engagement between the cam surface on each of the at least one arm and the housing.

The objects of the present invention are additionally achieved by means of a handle adjustment system. The handle adjustment system comprises a main body having an exterior surface; and a bale handle connected to the main body and adapted for gripping by the hand, the bale handle being pivotally mounted with respect to the exterior surface. A first one of the exterior surface and the bale handle includes at least one projection engaging at least one recess formed in a second one of the exterior surface and the bale handle, whereby cooperative engagement between one of the at least one projection and one of the at least one recess define a detent adapted for maintaining the bale handle at a pivotal position with respect to the main body.

The objects of the present invention are yet additionally achieved by means of an interchangeable implement for connecting to a driving source including a power take-off accessible with respect to a main body. The interchangeable implement comprises a housing adapted for supporting a driven implement and adapted for matingly engaging the main body; two female members being formed in the housing and adapted to matingly receive a corresponding male member extending from the main body, each of the female members having a mating diameter in a range of 4 to 8 millimeters and being spaced apart a center-to-center distance in a range of 50 to 70 millimeters; and two projections extending from opposite sides of the housing, each of the two projections supporting a respective roller extending at least 2 millimeters from a respective one of the opposite sides to an enlarged shoulder, and a shoulder-to-shoulder measure between the enlarged shoulders being in a range of 80 to 110 millimeters.

Additional objects and advantages of the invention will be set forth in the description that follows, and in part will be readily apparent to those skilled in the art from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
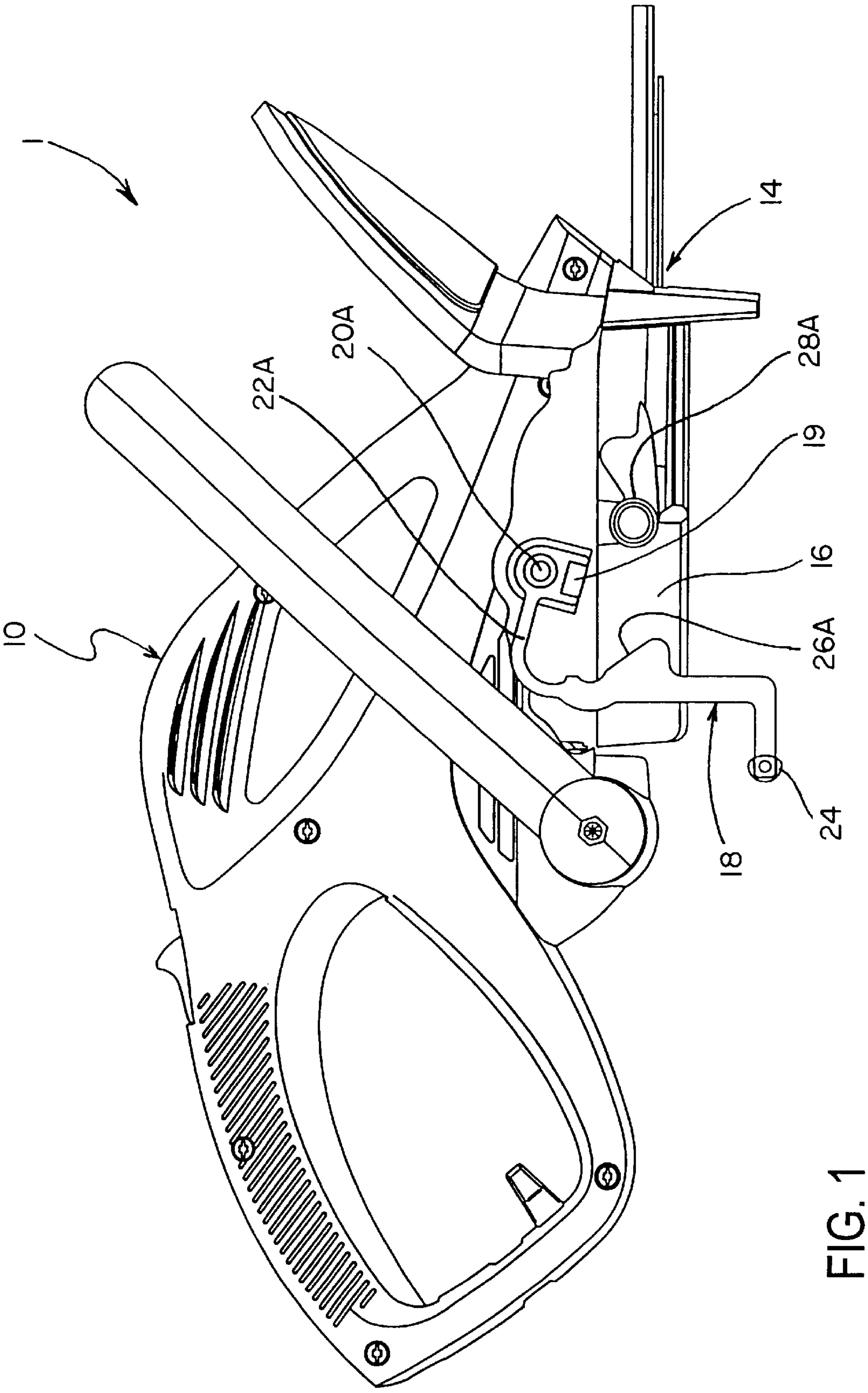
FIG. 1 is a schematic illustration of a power tool according to the present invention having a main body matingly engaging a housing of a working implement, and a latch assembly in a first, unlatched, position.
Figure 2:
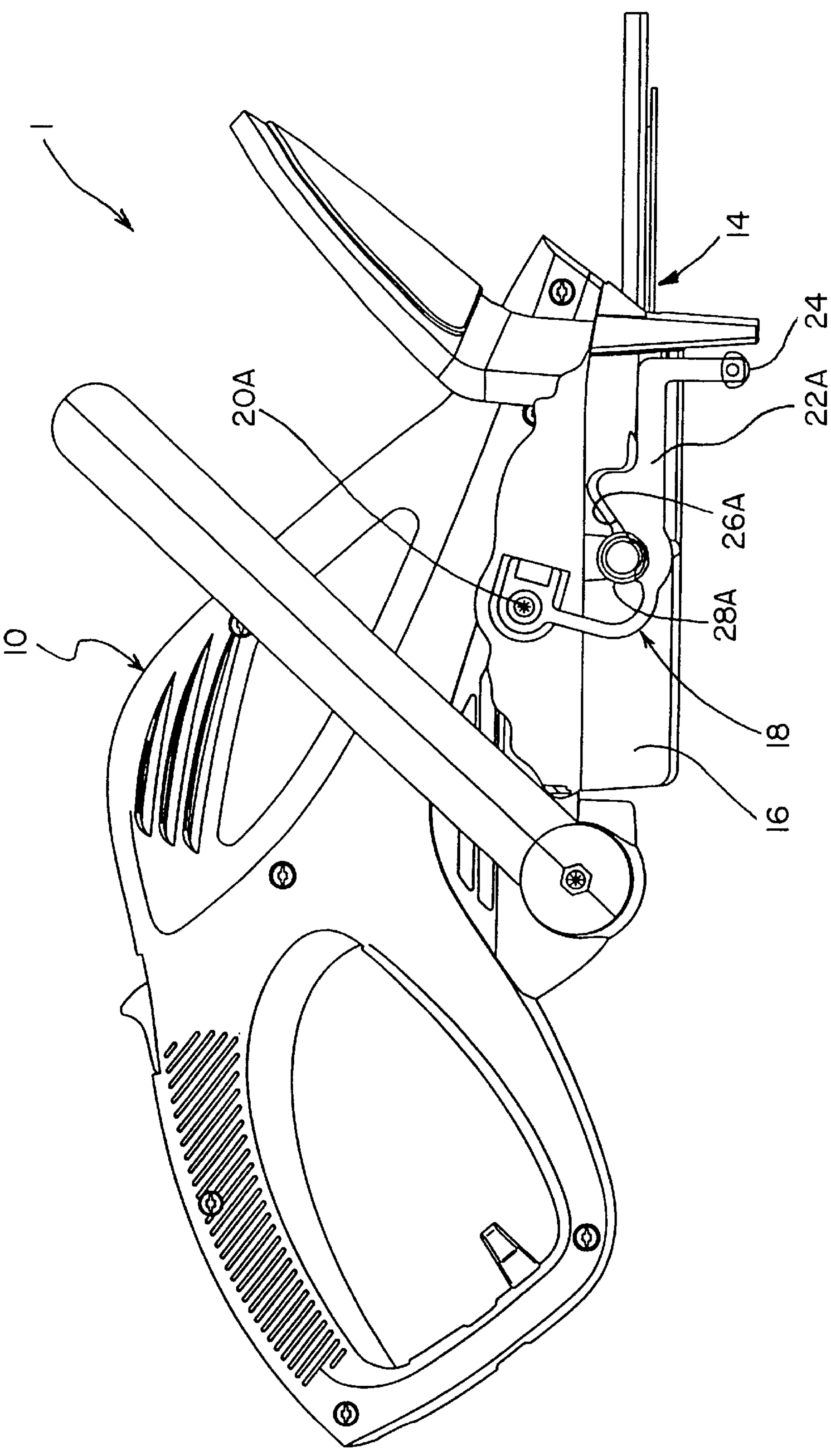
FIG. 2 is a schematic illustration of the power tool shown in FIG. 1, with the latch assembly in a second, latched, position.

A hand-held power tool 1 is shown in FIGS. 1 and 2. The power tool 1 includes a main body 10 supporting and enclosing a driving source such as an electric motor or an internal combustion engine (not shown). The main body 10 additionally supports conventional controls and auxiliary systems (not shown) for operating the driving source. The main body 10 also provides at least one means for a user's hands to hold the power tool 1.

A working implement 14 is operably connected to the driving source. For the sake of illustration, a double edge hedge-trimming implement is generically illustrated throughout the drawings. However, in accordance with the present invention, implements of different types and/or characteristics may also be used in connection with the main body 10. One example of a different type of implement is a rotary saw, as opposed to a reciprocating saw.

A housing or cassette 16 connects the implement 14 to the main body 10. The cassette 16 provides a physical connection for supporting the mass of the implement 14 with respect to the main body 10, as well as houses a driving connection between the driving source and the implement 14.

The connection between the cassette 16 and the main body 10 provides a detachable interface such that different types and/or sizes of working implements may be readily connected to the main body 10 by different cassettes 16. Specifically, the cassette 16 provides a single type of connection for attaching a range of implements having different characteristics (e.g., type, size, etc.) to the same main body 10. Similarly, the cassette 16 enables the implement 14 to be connected to a range of main bodies 10 having different characteristics (e.g., driving source type, power output, etc.).

According to the present invention, a large collection of power tools is provided by interchangeably connecting small numbers of main bodies 10 and cassettes 16. Thus, a user is able to select the appropriate power tool for a desired task without the expense of purchasing, maintaining and storing a wide range of individual power tools.

Figure 3:
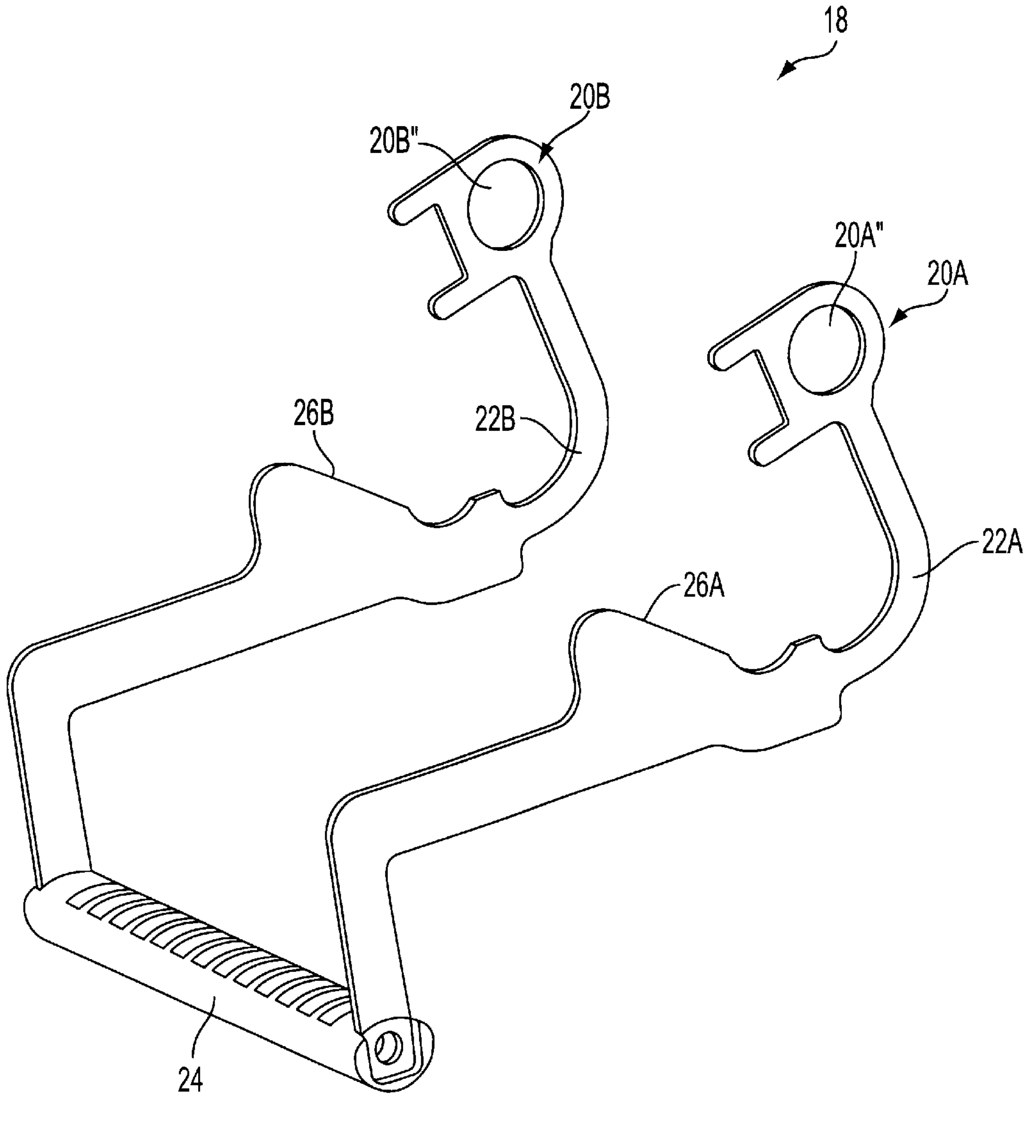
FIG. 3 is a perspective view of the latch assembly shown in FIG. 1.

According to a preferred embodiment of the present invention, as illustrated in FIGS. 1–3, a latch assembly 18 is used to secure and release the cassette 16 with respect to the main body 10. The latch assembly 18 is pivotally mounted with respect to the gear case 12 at a pair of pivot points 20A and 20B on opposite sides of the gear case 12. Spacers 19, see FIG. 1, are interposed between the latch assembly 18 and a pair of bosses 20 (only one shown) formed on the opposite sides of the gear case 12. This provides electrical insulation for the latch assembly 18 from the gear case 12, drive mechanism, and blades 50A,50B in the event the insulation of the power cord (for an electric powered version) is severed accidentally while operating the power tool 1. The spacers 19, which are preferably made of plastic, also provide a durable, low friction bearing surface for the latch assembly 18 to pivot on, as opposed to having the latches wearing into the bosses 20 on the gear case 12 when pivoted. The latch assembly 18 includes a pair of latch arms 22A and 22B extending substantially parallel to one another and transversely from a common grip 24 to a corresponding one of the pivot points 20A,20B. According to the preferred embodiment of the present invention, each of the pivot points 20 comprises one of the two bosses 20A',20B' on the gear case 12, respectively, and one of two holes 20A" and 20B", respectively, on the latch arms 22A,22B. Although the bosses 20 are shown formed on the gear case 12 and the holes 20A",20B" are shown formed in the latch arms 22A, 22B, the bosses 20 may alternatively be formed on the latch arms 22A,22B and the holes 20A",20B" formed in the gear case 12.

The latch arms 22A,22B include respective cam surfaces 26A and 26B for engaging corresponding rollers 28A and 28B mounted for rotation about posts on opposite sides of the cassette 16. The cam surfaces 26A,26B and the rollers 28A,28B comprise overcenter mechanisms such that as the latch assembly 18 is elastically deformed during pivoting with respect to the gear case 12. Specifically, as the latch assembly 18 is pivoted from a relaxed (i.e., un-deformed) state to a first position, the cam surfaces 26A,26B engage the rollers 28A,28B so as to elastically elongate that portion of the latch arms 22A,22B extending from the pivot points 20A,20B to the cam surfaces 26A,26B. Upon further pivoting the latch assembly 18 to a second position, the cam surfaces 26A,26B remain engaged with the rollers 28A,28B; however, the latch arms 22A,22B are elongated to a lesser degree. As is known with overcenter mechanisms, the latch arms 22A,22B tend to be biased away from the first position of greatest elongation to either the second position of reduced elongation, or to a third position wherein the latch arms 22A,22B are in the relaxed state. Thus, the latch assembly 18 secures and releases the cassette 16 with respect to the gear case 12 simply by pivoting the latch assembly 18 with respect to the gear case 12, i.e., without the need of any additional tools or fasteners. By virtue of the grip 24 being spaced apart from the pivot points 20A,20B a greater distance than the cam surfaces 26A,26B are spaced apart from the pivot points 20A,20B, a mechanical advantage is realized.

Figure 4:
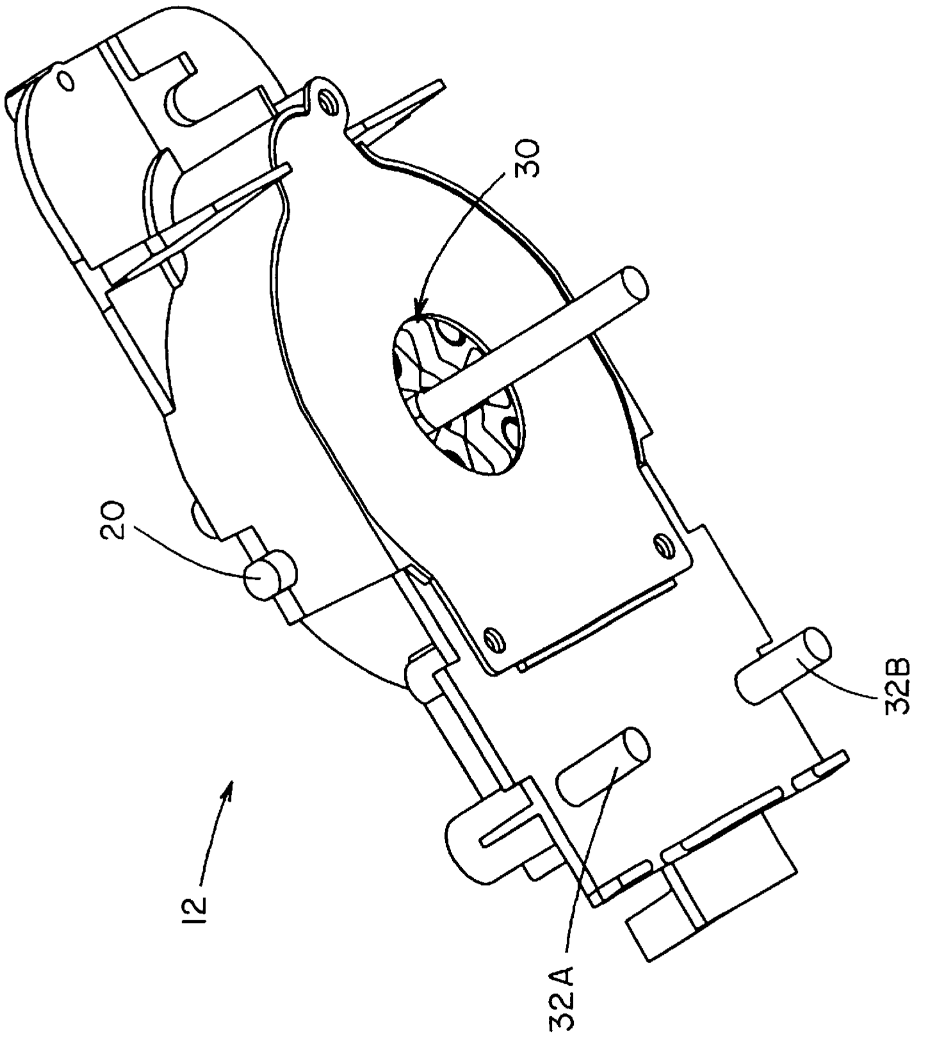
FIG. 4 is a perspective view of a gear case portion of the power tool main body according to the present invention.

FIG. 4 shows the surface of the gear case 12 that interfaces with the cassette 16. In a preferred embodiment of the present invention, a first clutch part, or clutch hub, 30 is driven by the driving source and is accessible from the exterior of the gear case 12. The clutch hub 30 provides a driving force that is transferred through the cassette 16 to operate the implement 14. Also projecting from the gear case 12 are positioning pins 32A and 32B for locating the cassette 16 with respect to the gear case 12. As will be described further with reference to FIG. 5, the pins 32A,32B are received in corresponding holes in the cassette's cover plate 40. Although the pins 32A and 32B are shown as part of the gear case 12 and the holes are shown as part of the cassette 16, the pins may alternatively be attached in the cassette 16, and the holes formed in the gear case 12.

Figure 5:
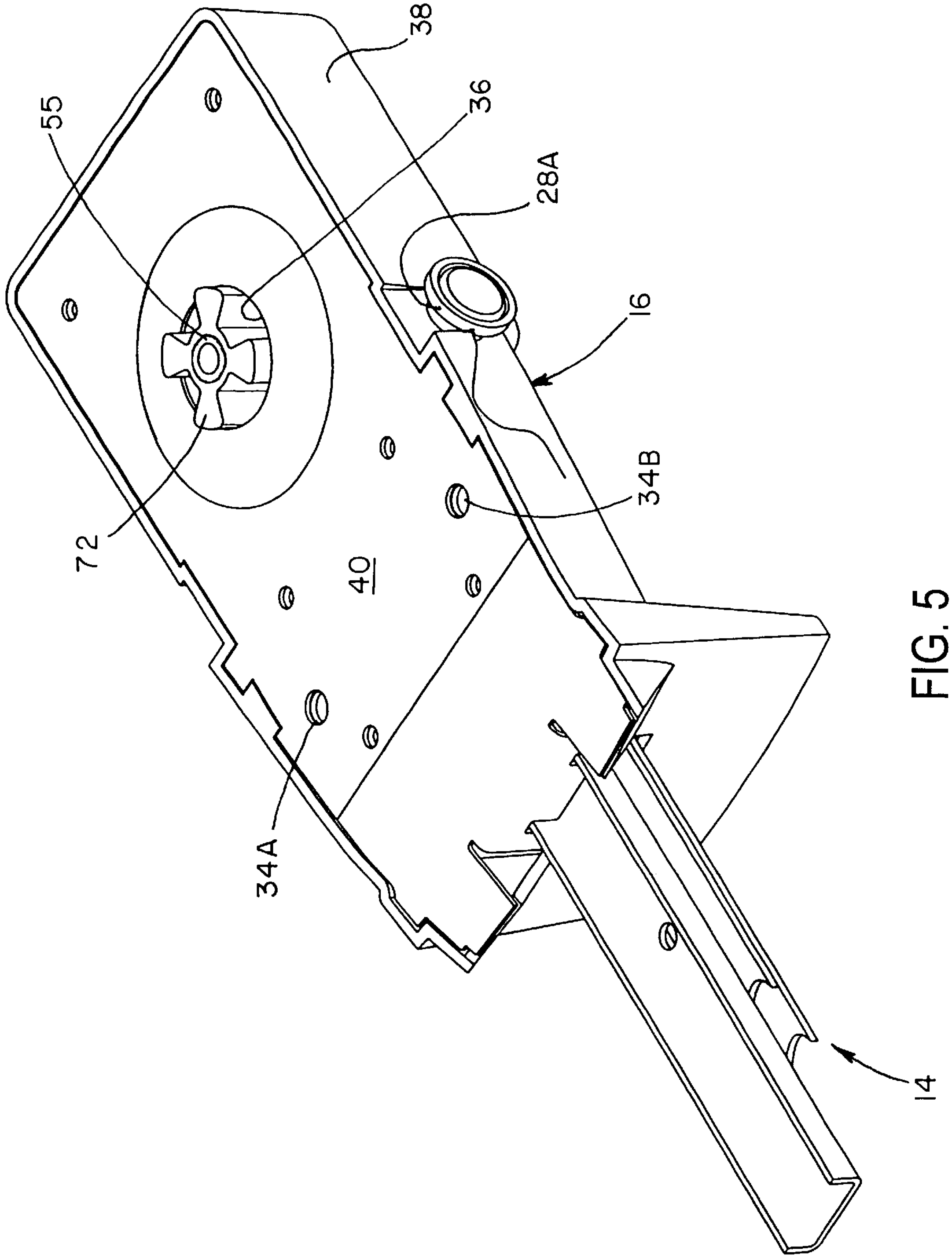
FIG. 5 is a perspective view of a working implement according to the present invention.

FIG. 5 shows the surface of the cover plate 40 that interfaces with the gear case 12. The pins 32A,32B are matingly received in holes 34A and 34B, and the clutch hub 30 matingly engages a second clutch part, or drive spud, 72).

Figure 6:
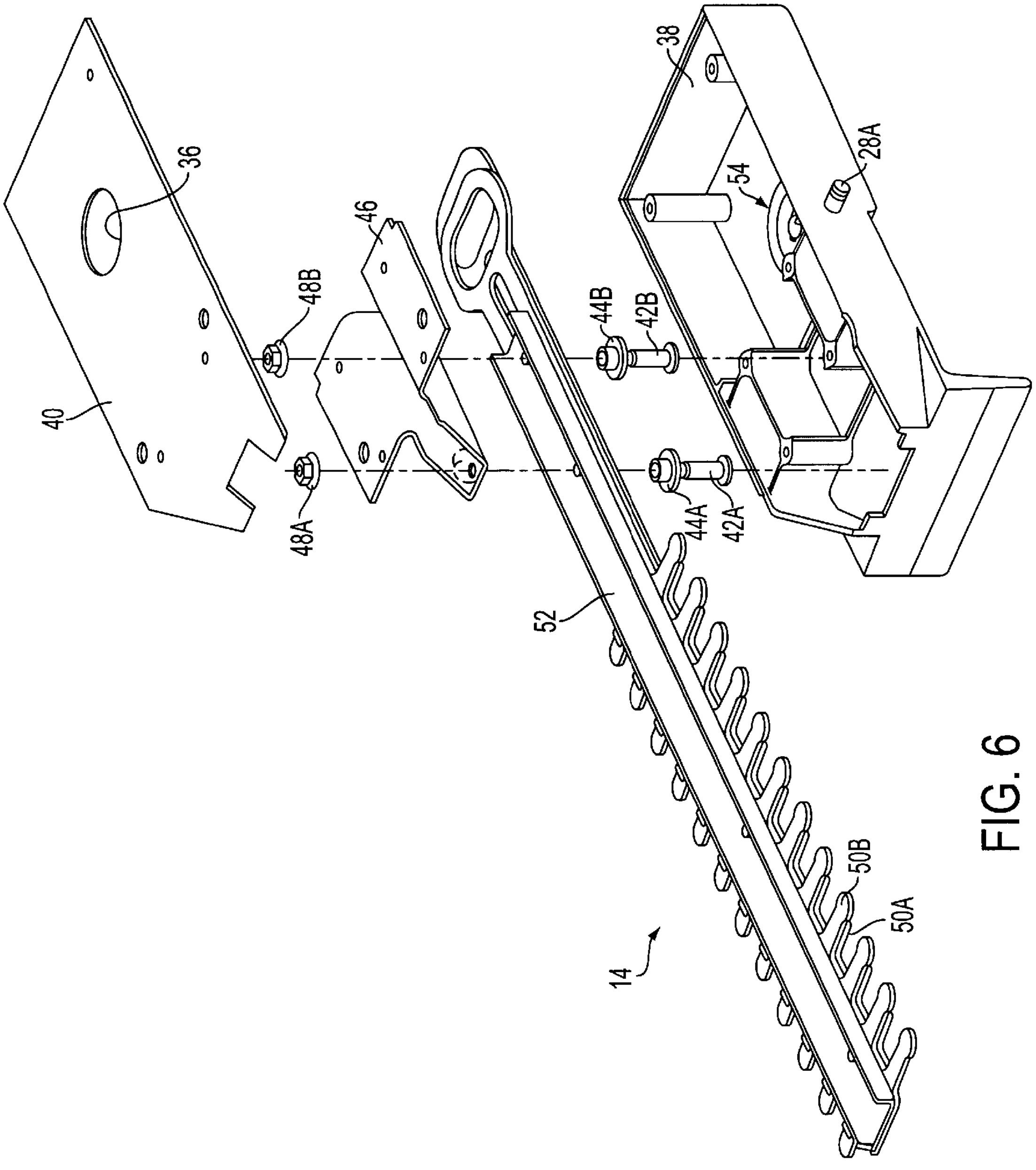
FIG. 6 is an exploded view of the working implement shown in FIG. 5.

FIGS. 5 and 6 show a preferred embodiment of the present invention having a cassette 16 for connecting a reciprocating, double edge hedge trimming implement 14 to the gear case 12. The cassette 16 includes a shell 38 and the cover plate 40, and defines an interior volume. The shell 38 supports the mass of the implement 14 that is retained by means of two fasteners 42A and 42B and two nuts 48A and 48B secured to a clamping plate 46, which is trapped between the shell 38 and the cover plate 40. Anti-friction washers 44A and 44B are interposed between respective ones of the fasteners 42A,42B and the blades 50A,50B for improving the relative sliding action and reducing wear of the implement 14 with respect to the cassette 16. Different clamping plates 46, fasteners 42A,42B, and nuts 48A,48B may be used to support implements 14 having different characteristics within the housing 16.

According to the preferred embodiment of the present invention, the implement 14 includes two stacked blades 50A and 50B that are longitudinally reciprocated with respect to one another. A blade support 52 extends along the length of the blades 50A,50B to maintain the relative relationship between the blades 50A,50B at the distal end thereof. The blades 50A,50B and blade support 52 operate in a conventional manner. The blades 50A,50B and the blade support 52 are interposed between the clamping plate 46 and the shell 38, and extend outward from the interior of the cassette 16 through an opening between the shell 38 and the cover plate 40. The relative configuration of the clamping plate 46 with respect to both the implement 14 and the cassette 16 ensures only the desired relative motion of the implement 14 with respect to the housing 16.

Also mounted in the interior of the shell 38 is the drive spud 72 for matingly engaging the clutch hub 30 and for transferring motion from the clutch hub 30 to the blades 50A,50B. According to the preferred embodiment of the present invention, the drive spud 72 engages a blade driver (not shown) that is rotates about the same axis of rotation as the clutch hub 30 and the drive spud 72. The blade driver includes eccentrics (not shown) that matingly engage the blades 50A,50B in a conventional manner for reciprocating the blades 50A,50B with respect to one another. The drive spud 72 may also include a bearing 55 for reducing heat and wear. The drive spud 72, clutch hub 30, blade driver, and the eccentrics may all also be made of a material capable of acting as its own bearing surface.

The cover plate 40 includes the aperture 36 for the drive spud 72 to protrude from to engage the clutch hub 30, as well as the holes 34A,34B for receiving the positioning pins 32A,32B.

When the cassette 16 is to be engaged with the gear case 12, the pins 32A,32B are aligned with the holes to prevent relative lateral movement between the cassette 16 and the gear case 12 The latch assembly 18 is subsequently pivoted to the second position described above to hold the cassette 16 against the gear case 12. Concurrently, the drive spud 72 passes through the aperture 36 and matingly engages the clutch hub 30 for conveying movement from the driving source, through the cassette 16, to the implement 14. The reverse procedure is used for disconnecting the cassette 16 from the gear case 12.

According the present invention, a common interface between cassette 16 and gear case 12 enables a wide range of implements 14 and main bodies 10 to be interchangeably connected.

Figures 7A, 7B:
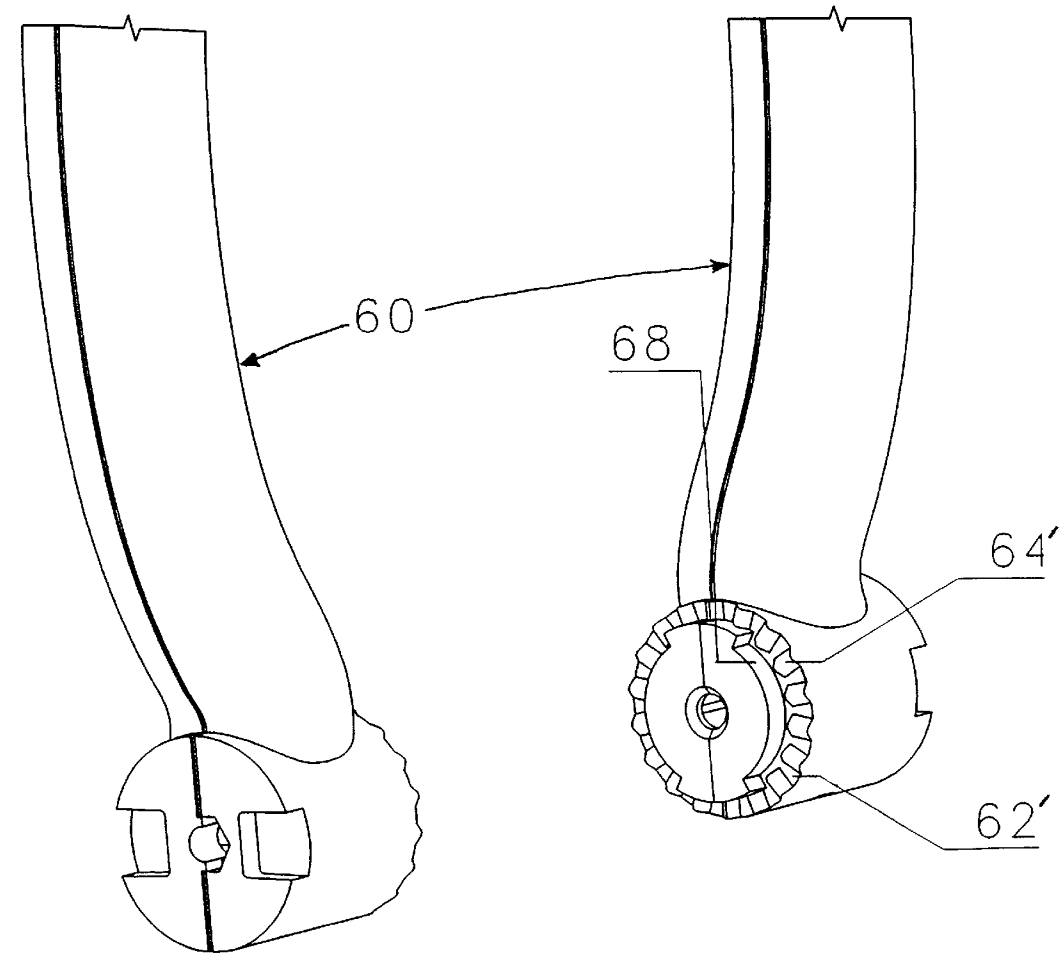
FIGS. 7A and 7B are perspective views of an auxiliary handle for a power tool according to the present invention.
Figure 8:
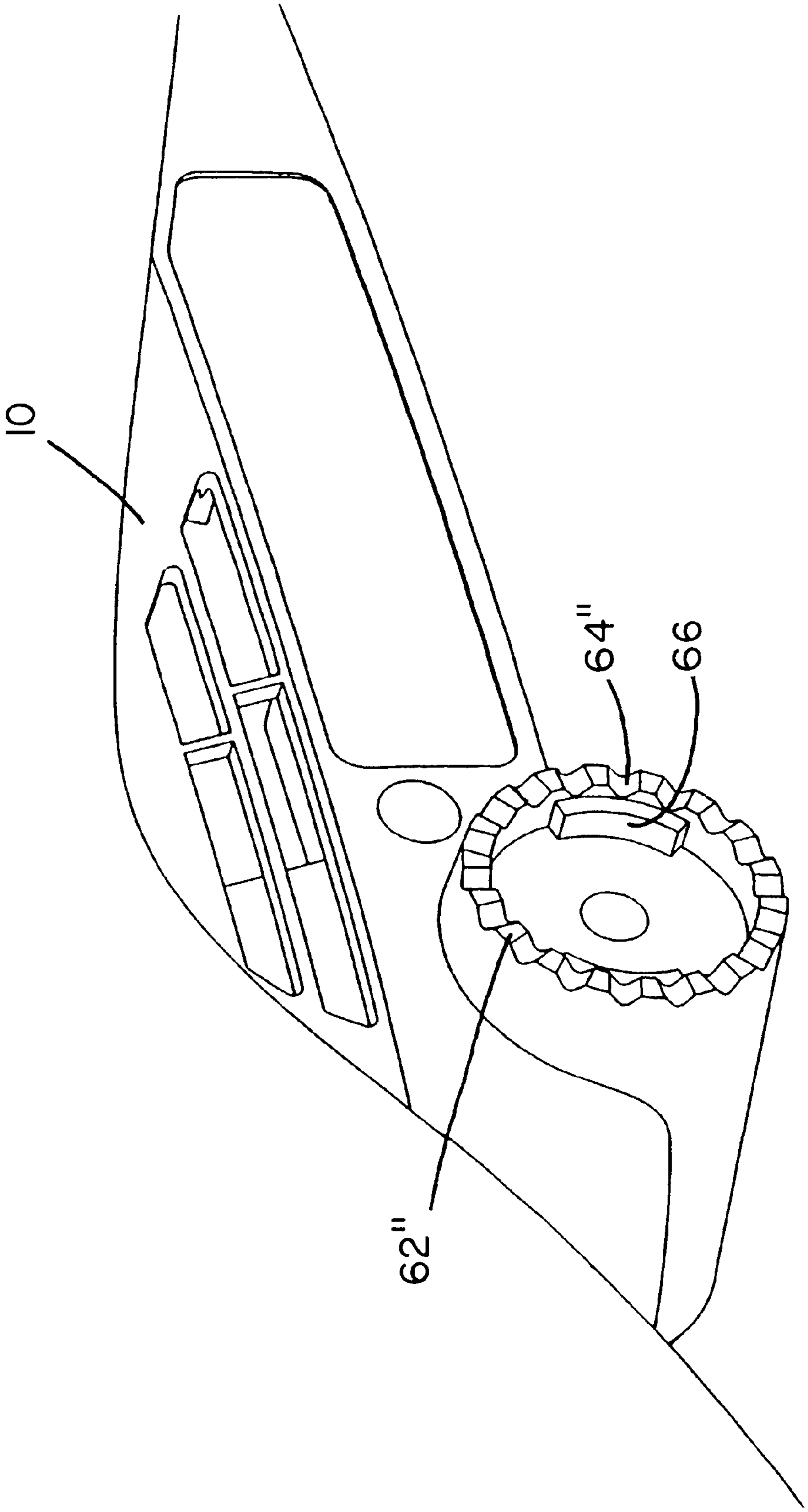
FIG. 8 is a perspective view of a detail of a main body of a power tool according to the present invention.
Figure 9:
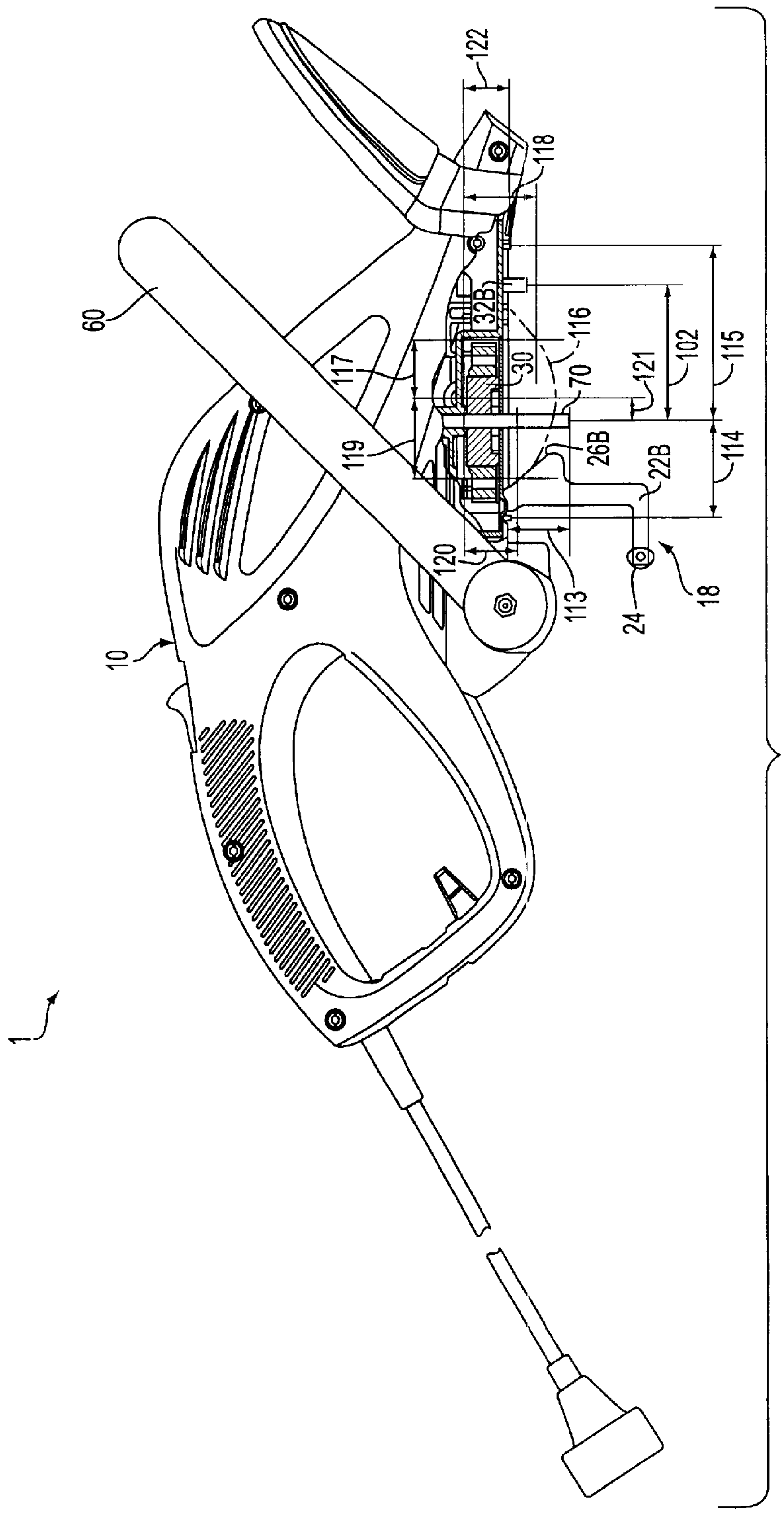
FIG. 9 is a partial cross-section view of a power tool according to a preferred embodiment of the present invention.
Figure 10:
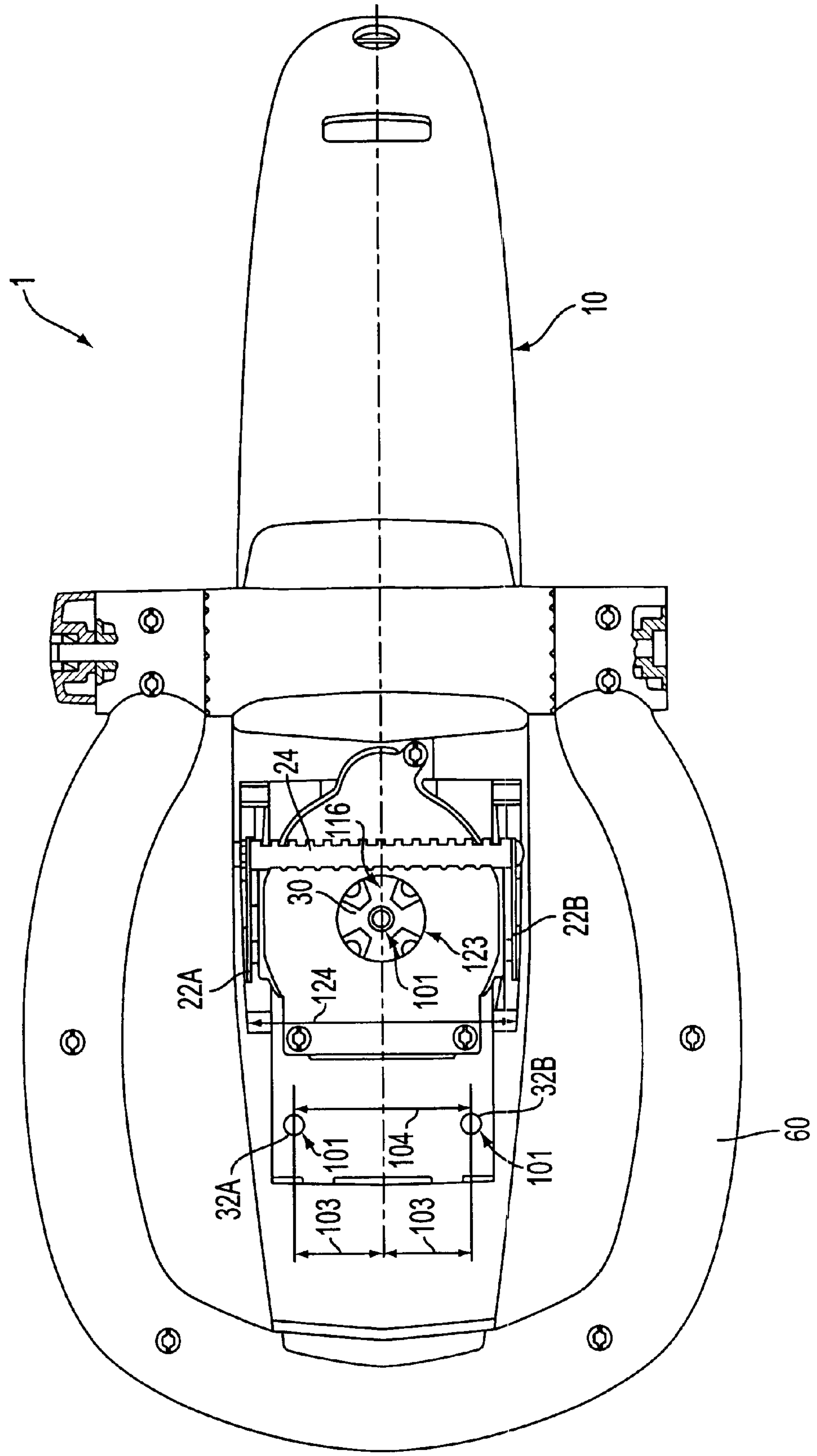
FIG. 10 is a bottom plan view of a main body of the preferred embodiment of the present invention illustrated in FIG. 9.
Figure 11:
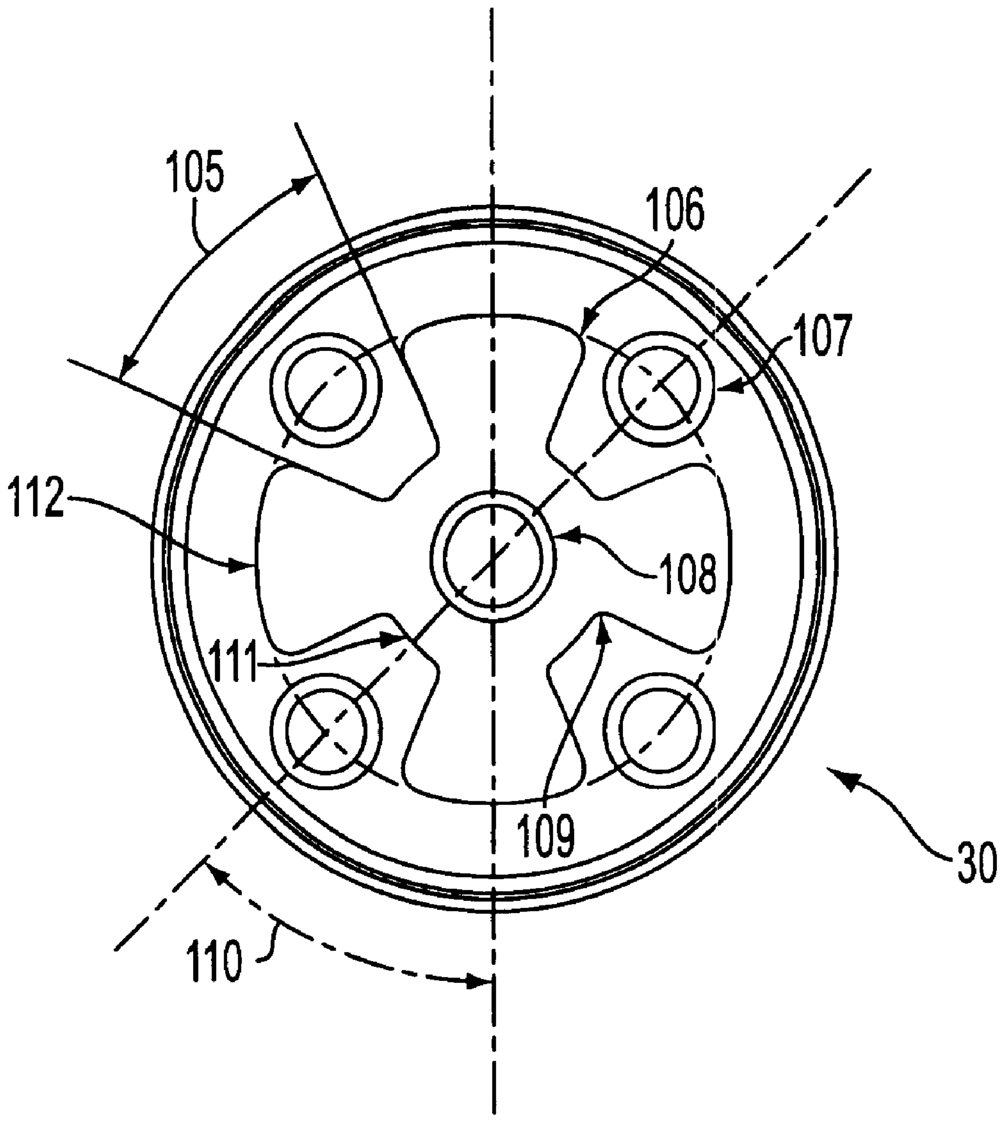
FIG. 11 is a detail view of a clutch hub according to the preferred embodiment of the present invention illustrated in FIG. 9.
Figure 12:
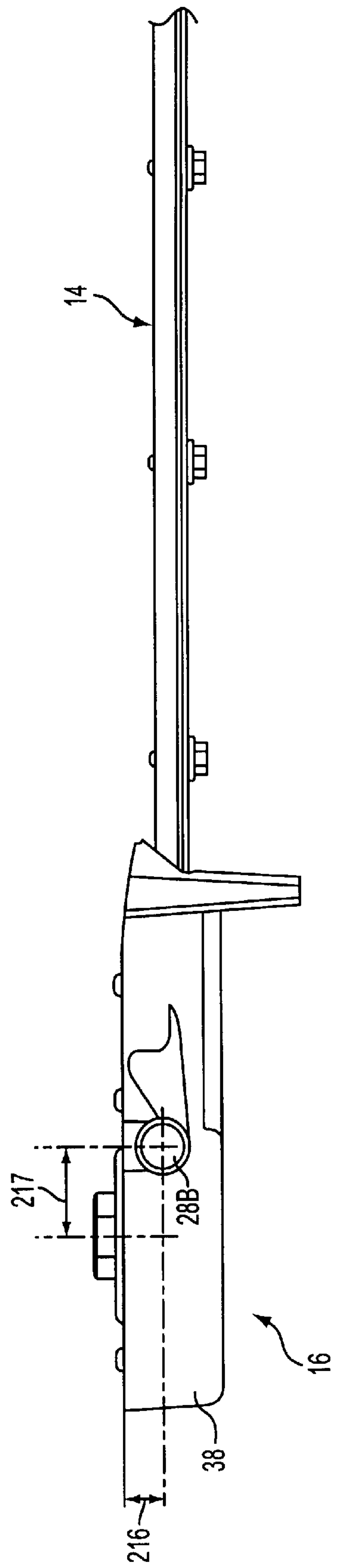
FIG. 12 is a side elevation view of a working implement according to a preferred embodiment of the present invention.
Figure 13:
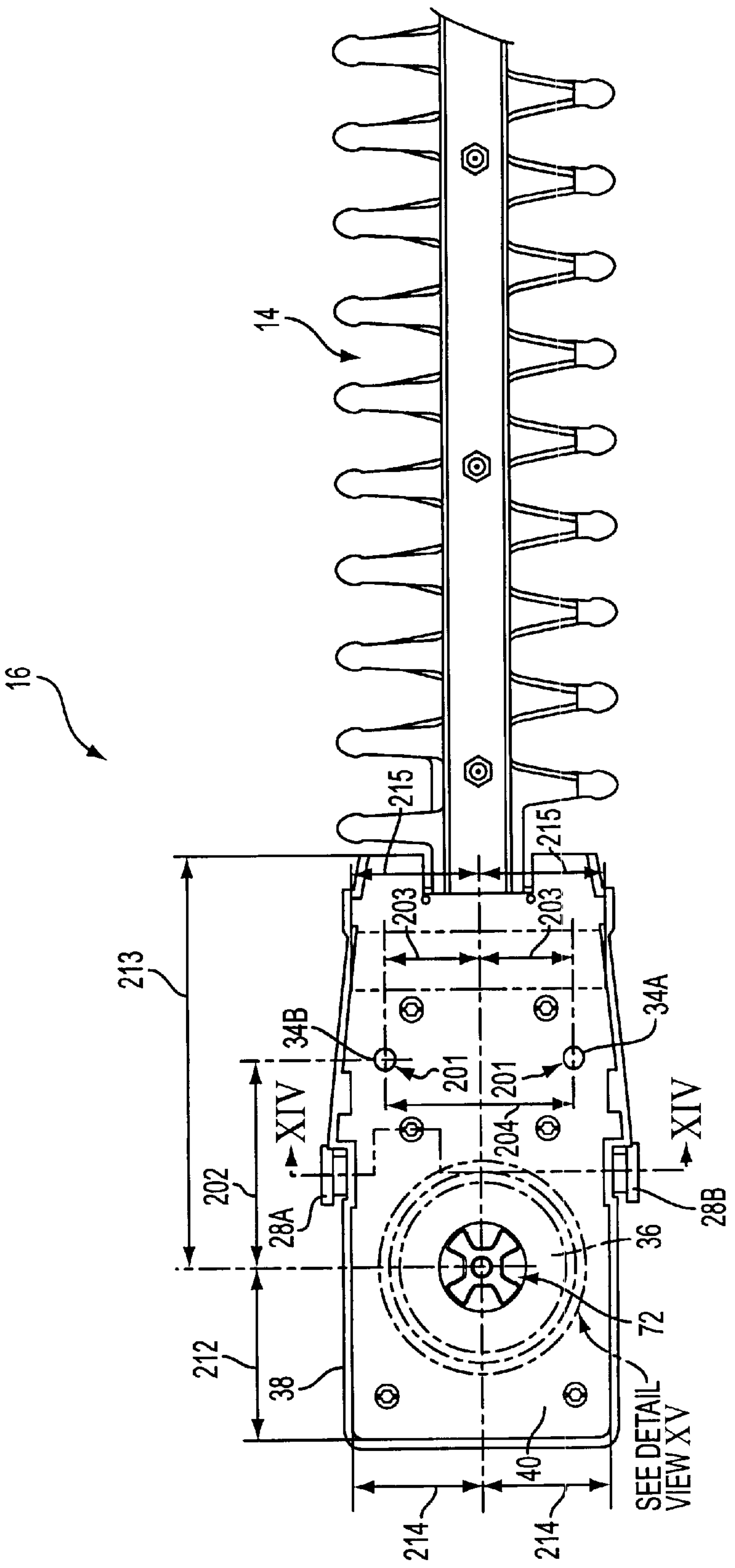
FIG. 13 is a top plan view of the working implement according to the preferred embodiment of the present invention illustrated in FIG. 12.
Figure 14:
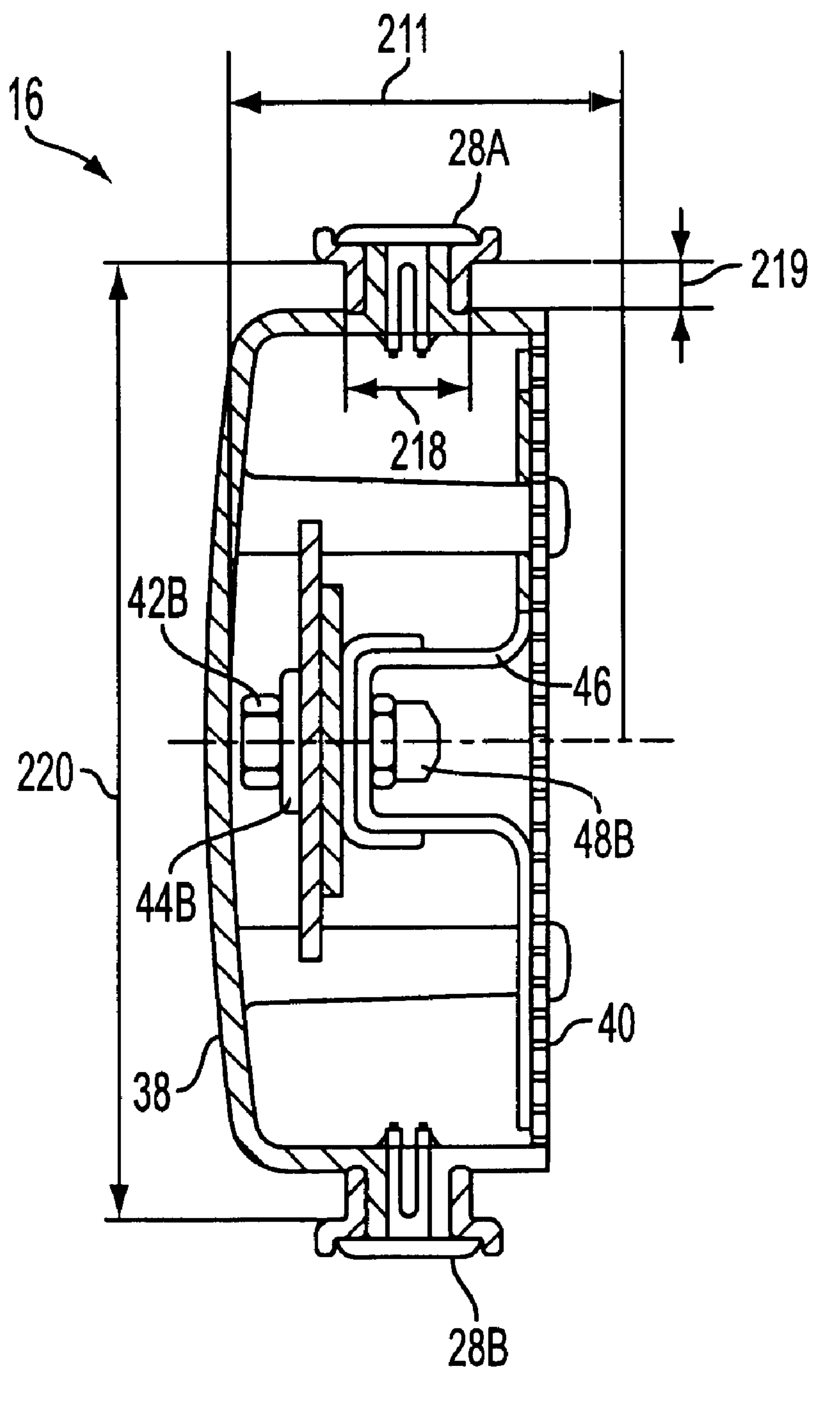
FIG. 14 is a cross-section view taken along line XIV—XIV in FIG. 13.
Figure 15:
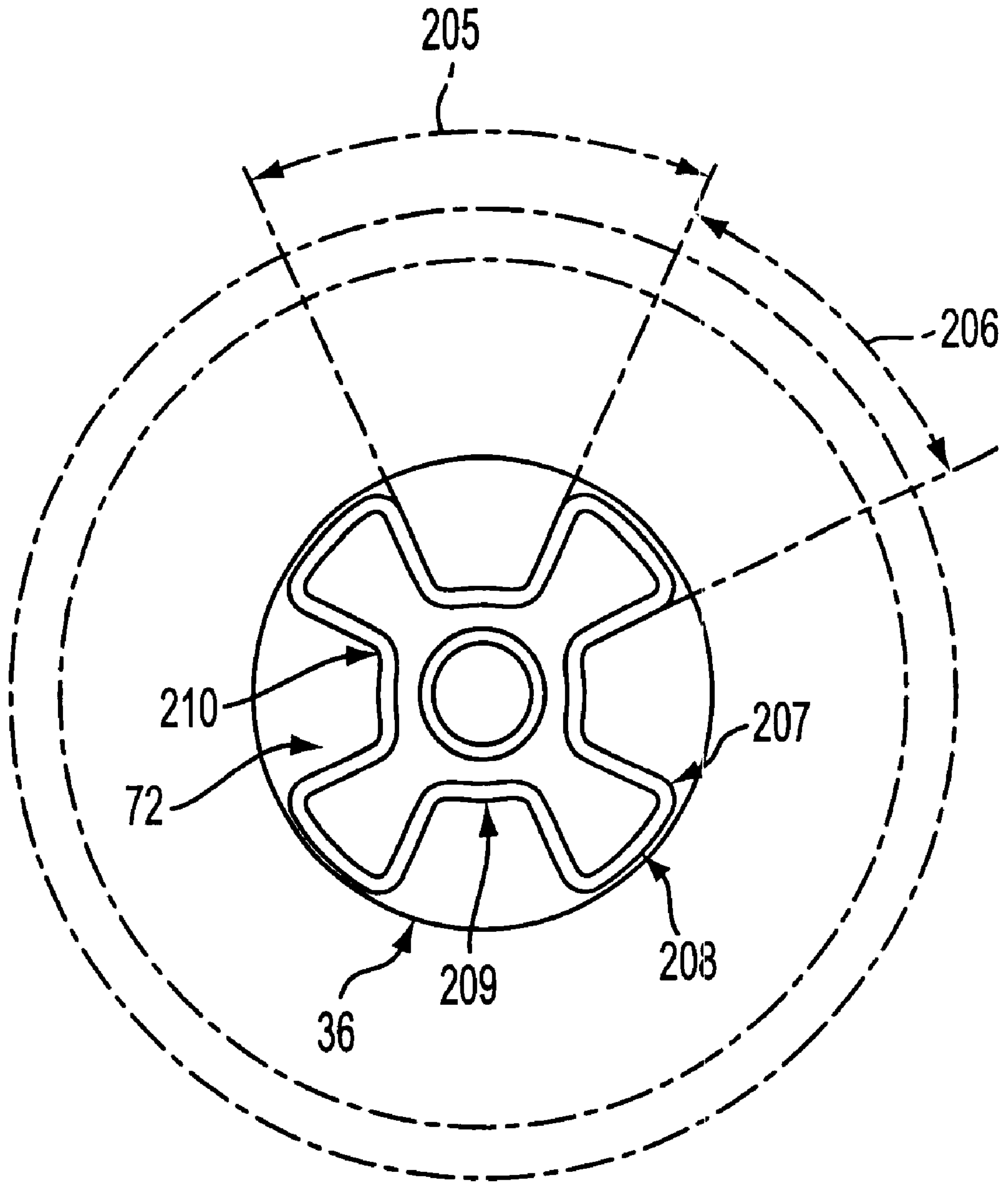
FIG. 15 is a detail view of a drive spud according to the preferred embodiment of the present invention illustrated in FIG. 12.

According to another aspect of the present invention as shown in FIGS. 7 and 8, a bale handle 60 may be adjustably attached to the main body 10. The adjustable bale handle 60 enables a user to hold the power tool 1 comfortably and safely after interchanging the implements 14 or after the user repositions themselves with respect to the workpiece.

According to a preferred embodiment of the present invention, the bale handle 60 is fastened to the main body 10 for pivotal movement about an axis. A detent system comprising at least one projection 62 and at least one recess 64 are matingly engageable for holding the bale handle 60 at a desired angular position with respect to the main body 10. According to the preferred embodiment illustrated in FIGS. 7 and 8, the bale handle 60 includes a plurality of the projections 62' and recesses 64' arranged so as to at least partially circumscribe the pivot axis, and the main body 10 includes a plurality of the recesses 64" (for engaging projections 62') and projections 62" (for engaging recesses 64') arranged so as to at least partially circumscribe the pivot axis. For each position of the bale handle 60 relative to the main body 10, at least one of the projections 62',62" is matingly received in one of the recesses 64',64", respectively. Elastically deforming the bale handle 60 so as to displace the projections 62 in a direction parallel to the axis and away from the recesses 64 enables the bale handle 60 to be angularly reoriented. Aligning and matingly engaging a different combination of the projections 62 with recesses 64 enables the bale handle 60 to be retained at a different angular position with respect to the main body 10.

A lock may be used to releasably secure the detent system. According to a preferred embodiment, the lock may comprise cooperatively engaging threaded male and female members that, when relatively tightened, hold the projections 62 in the recesses 64.

According to a preferred embodiment, the range of angular adjustment of the bale handle 60 with respect to the main body 10 is constrained by at least one stop 66 that extends axially from the main body 10 into at least one arcuate groove 68 in the bale handle 60. The arcuate groove 68 partially circumscribes the pivot axis. The location and length of the arcuate groove 68 defines the permissible range of motion for the bale handle 60 relative to the main body 10.

Although the projections 62 have been illustrated as being formed on the bale handle 60, and the recesses 64 have been illustrated as being formed on the main body 10, it is alternatively envisioned that the projections 62 may be formed on the main body 10 and the recesses 64 may be formed on the bale handle 60. Similarly, although the stop 66 has been illustrated as being formed on the main body 10 and the arcuate groove 68 has been illustrated as being formed on the bale handle 60, it is alternatively envisioned that the stop 66 may be formed on the bale handle 60 and the arcuate recess may be formed on the main body 10.

FIGS. 9–15 are directed to a preferred embodiment of the present invention. According to this preferred embodiment, a driving force is transmitted through the clutch hub 30 and the drive spud 72. The clutch hub 30 and the drive spud 72 are configured and arranged to cooperatively engage one another, thus facilitating transmission of the driving force from the main body 10 to the implement 14.

The dimensions according to preferred embodiments of the present invention are indicated with on the Figures and correspond with the reference numerals in Table 1.

TABLE 1

| Ref. No. | Description | Preferred Range | Preferred Example |
|---|---|---|---|
| 101 | Diameter of positioning pins 32A, 32B | 4–8 mm | 6.00 mm |
| 102 | Front to Back distance between gear center pin 70 and positioning pins 32A, 32B | 55–75 mm | 65.00 mm |
| 103 | Distance from center line between positioning pins 32A, 32B to each of the positioning pins 32A, 32B | 25–35 mm | 30.25 mm |
| 104 | Distance between positioning pins 32A, 32B | 50–70 mm | 60.50 mm |
| 105 | Angle of drive tooth for clutch hub 30 | 30–60° | 40° |
| 106 | Radius of drive tooth outside corner for clutch hub 30 | 1–2 mm | 1.50 mm |
| 107 | Radius of inside surface of drive tooth for clutch hub 30 | 2–3 mm | 2.50 mm |
| 108 | Diameter of center hole of clutch hub 30 | 5–7 mm | 6.06 mm |
| 109 | Radius of drive tooth inside corner for clutch hub 30 | 0.5–1.5 mm | 1.00 mm |
| 110 | Angle between drive teeth for clutch hub 30 | 30–60° | 45° |
| 111 | Diameter between drive teeth for clutch hub 30 | 10–20 mm | 14.00 mm |
| 112 | Maximum distance of recess of drive teeth for clutch hub 30 | 25–35 mm | 29.00 mm |
| 113 | Vertical distance from end of gear center pin 70 to the locating ribs on the gear case 12 | 25–35 mm | 29.42 mm |
| 114 | Horizontal distance from gear center pin 70 to the rear locating ribs on the gear case 12 | 35–55 mm | 45.00 mm |
| 115 | Horizontal distance from gear center pin 70 to the front locating ribs on the gear case 12 | 70–95 mm | 82.50 mm |
| 116 | Radius of arc that latch assembly 18 swings through about pivot points 20A, 20B | 35–55 mm | 45.40 mm |
| 117 | Horizontal distance from pivot points 20A, 20B to initial position of the arc for latch assembly 18 | 30–50 mm | 37.10 mm |
| 118 | Vertical distance from pivot points 20A, 20B to initial position of the arc for latch assembly 18 | 20–35 mm | 26.15 mm |
| 119 | Horizontal distance from pivot points 20A, 20B to final position of the arc for latch assembly 18 | 20–40 mm | 30.35 mm |
| 120 | Vertical distance from pivot points 20A, 20B to final position of the arc for latch assembly 18 | 25–40 mm | 33.76 mm |
| 121 | Horizontal distance from gear center pin 70 to pivot points 20A, 20B | 5–15 mm | 10.40 mm |

TABLE 1-continued

| Ref. No. | Description | Preferred Range | Preferred Example |
|---|---|---|---|
| 122 | Vertical distance from pivot points 20A, 20B to locating ribs on gear case 12 | 15–30 mm | 23.18 mm |
| 123 | Diameter of opening in gear case cover | 20–40 mm | 28.50 mm |
| 124 | Inside distance between latches 22A, 22B | 70–110 mm | 88.70 mm |
| 201 | Diameter of holes 34A, 34B | 4–8 mm | 6.00 mm |
| 202 | Front to back distance between centers of aperture 36 and holes 34A, 34B | 50–80 mm | 65.00 mm |
| 203 | Side to side distance from center of aperture 36 to centers of holes 34A, 34B | 25–35 mm | 30.25 mm |
| 204 | Distance between centers of holes 34A, 34B | 50–70 mm | 60.50 mm |
| 205 | Angle of recess between drive teeth for drive spud 72 | 30–60° | 50° |
| 206 | Angle of driven teeth for drive spud 72 | 30–60 mm | 40° |
| 207 | Outside corner radius of driven teeth for drive spud 72 | 1–2 mm | 1.50 mm |
| 208 | Outside diameter of driven teeth for drive spud 72 | 25–35 mm | 27.60 mm |
| 209 | Inside diameter of driven teeth for drive spud 72 | 8–18 mm | 13.00 mm |
| 210 | Inside corner radius of driven teeth for drive spud 72 | 0.5–1.5 mm | 1.00 mm |
| 211 | Vertical distance from cover plate 40 to bottom of shell 38 at the gear center pin 70 location | 25–45 mm | 34.84 mm |
| 212 | Horizontal distance from center of drive spud 72 to back of cover plate 40 | 40–65 mm | 53.20 mm |
| 213 | Horizontal distance from center of drive spud 72 to front of cover plate 40 | 90–160 mm | 127.03 mm |
| 214 | Horizontal distance from center of drive spud 72 to sides of cover plate 40 at position of rear locating ribs on the gear case 12 after assembly | 30–50 mm | 41.00 mm |
| 215 | Horizontal distance from center of drive spud 72 to sides of cover plate 40 at position of front locating ribs one the gear case 12 after assembly | 30–50 mm | 41.30 mm |
| 216 | Vertical distance from cover plate 40 to centers of rollers 28A, 28B | 10–20 mm | 14.00 mm |
| 217 | Horizontal distance from center of drive spud 72 to centers of rollers 28A, 28B | 20–40 mm | 29.00 mm |
| 218 | Diameter of rolling surfaces of rollers 28A, 28B | 16–21 mm | 18.50 mm |
| 219 | Width of rolling surfaces of rollers 28A, 28B | >2 mm | 3.88 mm |
| 220 | Distance between rolling surfaces of rollers 28A and 28B | 80–110 mm | 93.02 mm |

Additional advantages and modifications will readily occur to those skilled in the art. Therefore, the invention in its broader aspects is not limited to the specific details, and representative devices, shown and described herein. Accordingly, various modifications may be made without departing from the spirit and scope of the general inventive concept as defined by the appended claims and their equivalents.

What is claimed is:

1. An attachment system for detachably connecting a interchangeable driven implement to a driving source that includes a power take-off accessible with respect to a main body thereof, the attachment system comprising:

a housing for supporting said driven implement and for matingly engaging said main body, said housing having a pair of latch engaging members;

a drive transfer associated with said housing and adapted for matingly connecting said power take-off to said driven implement; an implement mount for supporting said driven implement for movement with respect to said housing; and a latch for securing said housing to said main body, said latch having a pair of latching portions for engaging said latch engaging members and a grip for pivoting said latching portions relative to said main body, wherein said latch is adapted to be pivotally secured to said main body and swingable so that said grip swings over said housing to latch said latching portions onto said latch engaging members.

2. The attachment system according to claim 1, wherein said latch engaging members comprise a pair of rollers and said latching portions comprise cam surfaces for engaging said rollers.

3. The attachment system according to claim 2, wherein said latch is pivotal between a first position at which said cam surfaces are elastically deformed a first amount, a second position at which said cam surfaces are elastically deformed a second amount, which is less than said first amount, and a third position at which said cam surfaces are disengaged from said rollers, wherein said first position is operatively interposed between said second and third positions.

4. The attachment system according to claim 1, wherein said latch includes first and second arms for pivotal connection on opposite sides of the main body, said grip extending generally transversely with respect to said arms, each of said first and second arms having one of said latching portions, each of said latching portions comprising a cam surface;

wherein said latch engaging members comprise first and second projections extending from opposite sides of said housing, and said housing includes a respective roller mounted on each of said first and second projections for engaging a corresponding one of said cam surfaces.

5. The attachment system according to claim 4 wherein each of said respective rollers includes a rolling surface adapted for corresponding to one of said cam surfaces and an enlarged shoulder, each of said rolling surfaces extends at least 2 millimeters from a respective one of said opposite sides to said respective enlarged shoulder, and a measure between said enlarged shoulders is in a range of 80 to 110 millimeters.

6. The attachment system according to claim 5, wherein said rolling surfaces each extend 3.88 millimeters from said respective ones of said opposite sides to said respective enlarged shoulders, and said measure between said enlarged shoulders is 93.02 millimeters.

7. The attachment system according to claim 4, wherein each of said rollers mounted on said first and second projections has a rolling surface diameter in a range of 16 to 21 millimeters.

8. The attachment system according to claim 7, wherein said rolling surface diameter of each of said rollers mounted on said first and second projections is 18.50 millimeters.

9. The attachment system according to claim 1, further comprising:

at least one projection extending from one of said housing and main body; and at least one opening formed in the other of said housing and main body for receiving said projection, wherein said projection is received in said opening when said housing is matingly engaged with said main body.

10. The attachment system according to claim 9, wherein an outside diameter of said projection and a corresponding inside diameter of said opening are both in the range of 4 to 8 millimeters.

11. The attachment system according to claim 10, wherein said outside and inside diameters are both 6.00 millimeters.

12. The attachment system according to claim 9, wherein said housing has two of said projections and said main body has two of said openings.

13. The attachment system according to claim 12, wherein said two projections are spaced apart by a range of 50 to 70 millimeters.

14. The attachment system according to claim 13, wherein said two projections are spaced apart by 60.50 millimeters.

15. The attachment system according to claim 1, wherein said housing includes an aperture adapted for receiving the power take-off, and comprising a bearing adapted for stabilizing the power take-off with respect to said housing.

16. The attachment system according to claim 15, wherein said housing includes a shell and a cover, said cover includes said aperture and said bearing is supported by said shell; and wherein the driven implement extends from said housing between said shell and said cover.

17. The attachment system according to claim 1, wherein said implement mount is adapted for supporting reciprocating movement of the driven implement with respect to the housing, and wherein the driven implement is interposed between said implement mount and said housing.

18. The attachment system according to claim 17, further comprising:

at least one fastener connecting said implement mount to said housing, wherein said at least one fastener is adapted for extending through the driven implement; and at least one anti-friction member adapted to be interposed between a corresponding fastener and the driven implement.

19. The attachment system according to claim 1, wherein said interchangeable driven implement is a power tool, and the power tool further includes:

a generally hollow main body;

a bale handle connected to said main body, said bale handle being pivotally mounted with respect to said; main body;

a driving source being supported inside said main body and adapted for outputting mechanical energy; and a power take-off transferring said mechanical energy outside said main body.

20. The attachment system according to claim 19, wherein a first one of said main body and said bale handle include at least one projection engaging at least one recess formed in a second one of said main body and said bale handle, whereby cooperative engagement between one of said at least one projection and one of said at least one recess define a detent adapted for maintaining said bale handle at a pivotal position with respect to said main body.

21. The attachment system according to claim 20, wherein said bale handle is elastically deformable to release said cooperative engagement between said at least one projection and said at least one recess.

22. The attachment system according to claim 20, wherein a plurality of said detents provide a plurality of said pivotal positions for said bale handle with respect to said main body.

23. The attachment system according to claim 22, wherein said plurality of detents circumscribe a pivot axis for said bale handle with respect to said main body and are equiangularly spaced apart from one another.

24. The attachment system according to claim 20, further comprising:

a lock adapted for releasably securing said detent.

25. The attachment system according to claim 24, wherein said lock comprises cooperatively engaging male and female threaded members, whereby tightening said threaded members with respect to one another secures said detent.

26. The attachment system according to claim 19, further comprising:

a stop adapted for limiting pivotal movement of said bale handle with respect to said main body.

27. The attachment system according to claim 26, wherein said stop includes a pin extending from a first one of said bale handle and said main body, and a groove formed in a second one of said bale handle and said main body, wherein said pin is received in said groove.

28. The attachment system according to claim 27, wherein said groove includes a circular segment extending around a pivot axis for said bale handle with respect to said exterior surface.

29. The attachment system according to claim 1 wherein said pair of latching portions includes first and second arms adapted for pivotal connection on opposite sides of the main body about a pivot axis, and said grip extending generally transversely with respect to said arms and adapted for concurrently pivoting said first and second arms, each of said first and second arms having a respective cam surface;

wherein said latch engaging members include first and second projections extending from opposite sides of said housing, and each of said first and second projections supports a roller adapted for cooperatively engaging a corresponding one of said cam surfaces.

30. The attachment system according to claim 1, wherein the interchangeable driving implement, is a power tool system for trimming hedges, and the power tool further includes:

a main body at least partially enclosing a driving source;

a first housing adapted for mating engagement with respect to said main body, said a first attachment system, which comprises the attachment system according to claim 1, and a first set of relatively reciprocating blades adapted for being operatively driven by said driving source;

a second attachment system, which comprises the attachment system according to claim 1, and a second set of relatively reciprocating blades adapted for being operatively driven by said driving source.

* * * * *